US 7,039,026 B2

(12) United States Patent
Francoeur et al.

(10) Patent No.: US 7,039,026 B2
(45) Date of Patent: May 2, 2006

(54) ARCHITECTURE FOR IMPLEMENTATION OF RADIO ACCESS BEARER MANAGER (RABM) AND PACKET DATA CONVERGENCE PROTOCOL (PDCP) PROCESS

(75) Inventors: William Francoeur, Royersford, PA (US); Peter Shaomin Wang, E. Setauket, NY (US); Shiehlie Tom Wang, Plymouth Meeting, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/975,871

(22) Filed: Oct. 28, 2004

(65) Prior Publication Data

US 2005/0147061 A1    Jul. 7, 2005

Related U.S. Application Data

(60) Provisional application No. 60/515,686, filed on Oct. 30, 2003.

(51) Int. Cl.
*H04Q 7/20* (2006.01)
(52) U.S. Cl. ........................... 370/328; 370/469
(58) Field of Classification Search ............... 370/328, 370/469
See application file for complete search history.

(56) References Cited

U.S. PATENT DOCUMENTS

2001/0033582 A1*  10/2001  Sarkkinen et al. ......... 370/474

OTHER PUBLICATIONS

Engerle et al., "Radio Link Control-Acknowledged Mode Protocol Performance Modeling in UMTS", Mobile and Wireless Communications Network, IEEE, Sep. 2002, pp. 332-336.

* cited by examiner

*Primary Examiner*—Melvin Marcelo
(74) *Attorney, Agent, or Firm*—Volpe and Koenig, PC

(57) ABSTRACT

A wireless transmit receive unit (WTRU) and a method used in a WTRU for controlling wireless communication Packet Switched (PS) data flow on radio access bearers (RABs) between a radio link controller (RLC) and an Internet Protocol Relay (IPR). A combined Radio Access Bearer Manager/Packet Data Convergence Protocol (RABM/PDCP) component provides interface control with a Session Manager (SM) and a radio resource center (RRC) such that the processing of PS data and control of each RAB is associated with the processing of PS data and control of a single radio bearer (RB).

8 Claims, 3 Drawing Sheets

ARCHITECTURE FOR IMPLEMENTATION OF RADIO ACCESS BEARER MANAGER (RABM) AND PACKET DATA CONVERGENCE PROTOCOL (PDCP) PROCESS

CROSS REFERENCE TO RELATED APPLICATION(S)

This application claims priority from U.S. provisional application No. 60/515,686, filed Oct. 30, 2003, which is incorporated by reference as if fully set forth.

FIELD OF INVENTION

The present invention relates to methods and apparatus for wireless communication systems and, in particular, wireless transmit receive units (WTRUs) which implement Radio Access Bearer Managers (RABMs) and Packet Data Convergence Protocol (PDCP) processes.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). General Packet Radio Service (GPRS) and Enhanced Data Rates For GSM Evolution (EDGE) are examples of 2.5G technologies that offer relatively high speed data service on top of 2G GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a core network (CN) interconnected with a UMTS Terrestrial Radio Access Network (UTRAN) via an interface known as an Iu which is defined in detail in the current publicly available 3GPP specification documents. The UTRAN is configured to provide wireless telecommunication services to users through wireless transmit/receive units (WTRUs), also known as User Equipments (UEs) in 3GPP, via a radio interface known as a Uu. The UTRAN has one or more Radio Network Controllers (RNCs) and base stations, known as Node Bs in 3GPP, which collectively provide for the geographic coverage for wireless communications with WTRUs. One or more Node Bs are connected to each RNC via an interface known as an Iub in 3GPP. The UTRAN may have several groups of Node Bs connected to different RNCs; only two are shown in the example depicted in FIG. 1. Where more than one RNC is provided in a UTRAN, inter-RNC communication is performed via an Iur interface, also defined in 3GPP specifications.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B provides the physical radio connection with the WTRUs. The Node B receives signals over the Iub interface from the RNC that controls the radio signals transmitted by the Node B over the Uu interface.

A CN is responsible for routing information to its correct destination. For example, the CN may route voice traffic from a WTRU that is received by the UMTS via one of the Node Bs to a public switched telephone network (PSTN) or packet data destined for the Internet (not shown for purposes of simplicity). In 3GPP, the CN has six (6) major components: 1) a serving General Packet Radio Service (GPRS) support node (SGSN); 2) a gateway GPRS support node (GGSN); 3) a border gateway; 4) a visitor location register (VLR); 5) a mobile services switching center; and 6) a gateway mobile services switching center. The serving GPRS support node (SGSN) provides access to packet switched (PS) domains, such as the Internet. The gateway GPRS support node (GGSN) is a gateway node for connections to other networks. All data traffic going to other operator's networks or the Internet goes through the GGSN. The border gateway acts as a firewall to prevent attacks by intruders outside the network on subscribers within the network realm. The visitor location register (VLR) is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current locations of subscribers. The gateway mobile services switching center also receives and administers connection requests from subscribers from external networks.

The RNCs generally control internal functions of the UTRAN. The RNCs also provide intermediary services for communications having a local component via an Iub interface connection with a Node B and an external service component via a connection between the CN and an external system, for example, overseas calls made from a cell phone in a domestic UMTS.

Typically, an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched (PS) domain and the other to a circuit switched domain. Other important functions of the RNCs include confidentiality and integrity protection.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are publicly available and continue to be developed.

Radio Access Bearer Managers (RABMs) and Packet Data Convergence Protocol (PDCP) processes are known for 3GPP systyems. The present invention recognizes the desirability of combining these functions in a single component, particularly for mobile WRTUs.

SUMMARY

The invention provides a component which combines Radio Access Bearer Manager (RABM) and Packet Data Convergence Protocol (PDCP) processes for wireless transmit receive units (WTRUs), particularly useful for mobile WRTUs, also referred to as UEs, in a Universal Mobile Telecommunications Systems (UMTS) wireless communication system.

Preferably the WTRU has an internet protocol relay (IPR) that transports packet switched (PS) data on radio access bearers (RABs), a session manager (SM) that manages RABs via PDP contexts, a radio resource controller (RRC) that controls RAB and RB assignments for the WTRU and a radio link controller (RLC) that transports PS data on radio bearers (RBs). A combined RABM/PDCP unit is provided that is configured to control wireless communication PS data flow between the RLC and the IPR and to provide interface control with the SM and RRC such that the processing of PS data and control of each RAB is associated with the processing of PS data and control of a single RB.

Other objects and advantages will be apparent to those of ordinary skill in the art based upon the following description of presently preferred embodiments of the invention.

BRIEF DESCRIPTION OF THE DRAWING(S)

TABLE OF ACRONYMS

Figure 1:
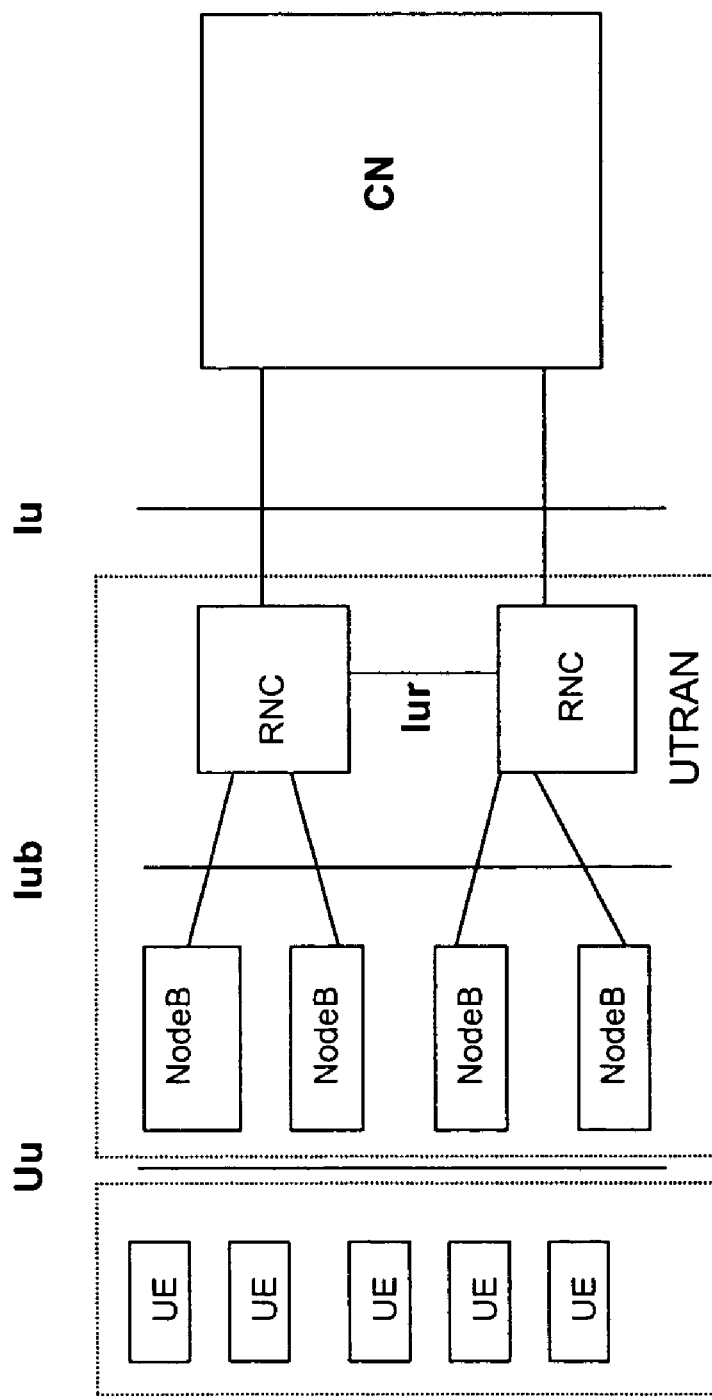
FIG. 1 shows an overview of a system architecture of a conventional UMTS network.

| | |
|---|---|
| 2G | Second Generation Mobile Radio System Standard |
| 3GPP | Third Generation Partnership Project |
| ARIB | Association Of Radio Industries Businesses |
| AS | Access Stratum |
| ASIC | Application Specific Integrated Circuit |
| BMC | Broadcast/Multicast Control |
| CN | Core Network |
| DCH | Dedicated Channel |
| DL | Downlink |
| ETSI SMG | European Telecommunications Standard Institute - Special Mobile Group |
| FDD | Frequency Division Duplex |
| GPRS | General Packet Radio Service |
| GMM | GPRS Mobility Management |
| GSM | Global System For Mobile Telecommunications |
| HS | High Speed |
| HSDPA | High Speed Down Link Packet Access |
| HS-DSCH | High Speed Downlink Shared Channel |
| MAC | Medium Access Control |
| NAS | Non-Access Stratum |
| NSAPI | Network Service Access Point Identifier |
| PDCP | Packet Data Convergence Protocol |
| PDP | Packet Data Protocol |
| PHY | Physical Layer |
| PS | Packet Switched |
| PSTN | Public Switched Telephone Network |
| RAB | Radio Access Bearer |
| RABC | Radio Access Bearer Controller |
| RABM | Radio Access Bearer Manager |
| RB | Radio Bearer |
| RLC | Radio Link Control |
| RNCs | Radio Network Controllers |
| RRC | Radio Resource Controller |
| SM | Session Manager |
| SNDCP | Sub-Network Dependent Convergence Protocol |
| TDD | Time-Division Duplex |
| TS | Time Slot |
| TTI | Transmission Time Interval |
| Tx | Transmission |
| UBMC | UE Broadcast/Multicast Control |
| UEs | User Equipments |
| UL | Uplink |
| UPDCP | UE Packet Data Convergence Protocol |
| URABM | UE Radio Access Bearer Manager |
| UMAC | UE Medium Access Control |
| UMTS | Universal Mobile Telecommunication System |
| URLC | UE Radio Link Control |
| URRC | UE Radio Resource Control |
| UTRAN | UMTS terrestrial radio access network |
| WTRUs | Wireless Transmit Receive Units |

DETAILED DESCRIPTION OF THE PREFERRED EMBODIMENT(S)

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

The present invention is particularly useful when used in conjunction with mobile units, i.e., mobile WTRUs. For example, the invention can be implemented in UEs of the conventional UTMS system illustrated in FIG. 1.

Figure 2:
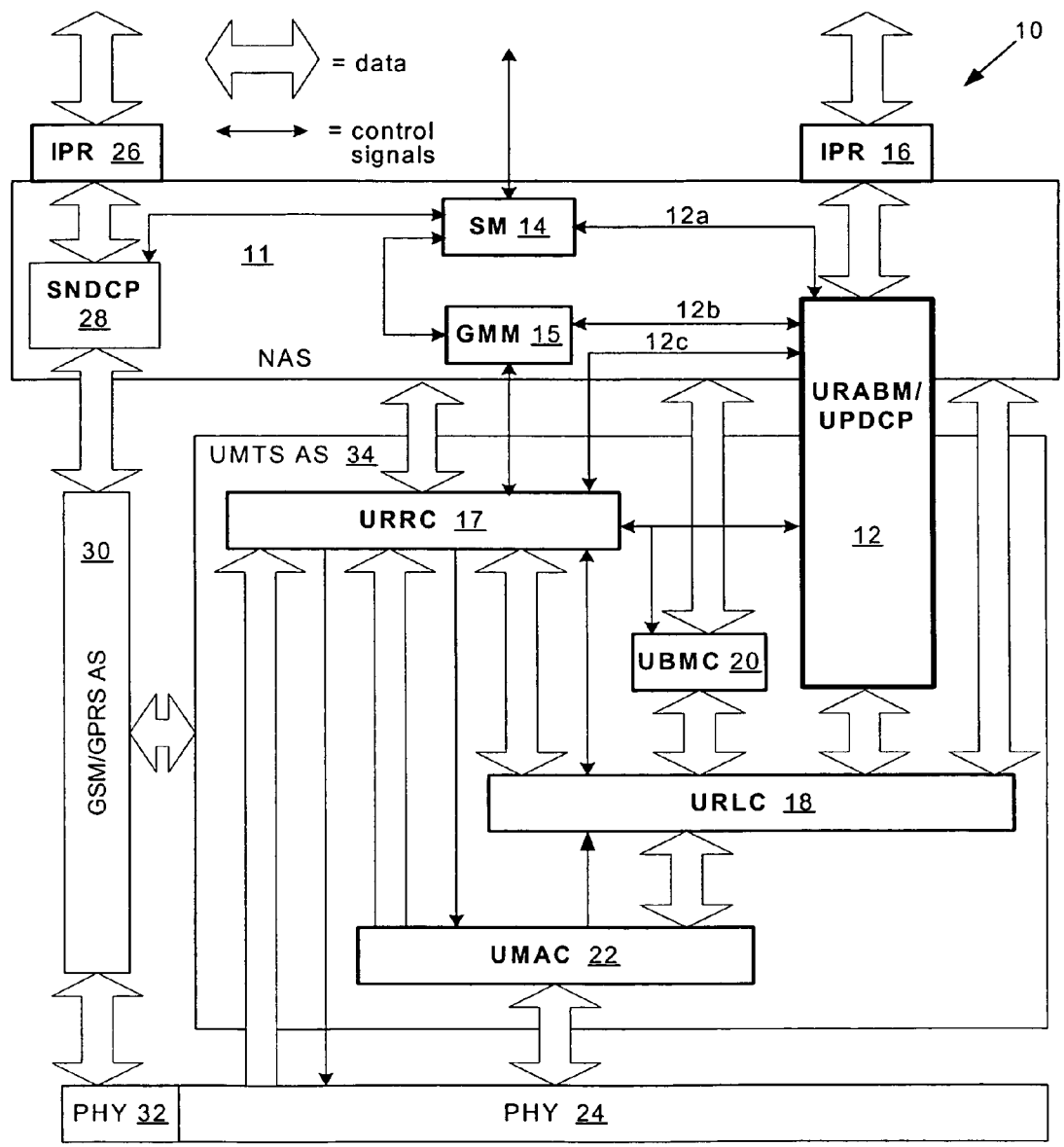
FIG. 2 is a schematic diagram of a UE with combined URABM_UPDCP.

Referring to FIG. 2, there is shown WTRU 10 having a combined UE Radio Access Bearer Manager (URABM)/UE Packet Data Convergence Protocol (URABM/UPDCP) component 12 in a WTRU in accordance with the teachings of the invention. The combined URABM UPDCP processor 12 shown in FIG. 2 preferably spans non-access stratum (NAS) and access stratum (AS) components and is configured to consolidate functions of URABM and UPDCP into one component based on the fact that one Network Service Access Point Identifier (NSAPI) is mapped to one Radio Access Bearer (RAB), which contains only one Radio Bearer (RB). In order to set up a Packet Data Protocol (PDP) context, a control interface 12a to a Session Manager (SM) 14 of NAS components 11 is used to set up Packet Switched (PS) Data Service for a network communication with the UE via a UMTS AS section 34 or a GSM/GPRS AS section 30 of the UE 10.

The UE 10 is configured to provide PS data service for the UMTS domain via an Internet Protocol Relay (IPR) 16, the combined URABM/UPDCP processor 12 and the UMTS AS 34 via a UE Radio Link Control (URLC) 18 therein, as shown in FIG. 2. Within the UMTS AS 34, the URLC 18 also has a data interfaces with a UE broadcast/multicast control (UBMC) 20 and a UE medium access control (UMAC) 22, the latter having a data interface with UMTS physical layer (PHY) components 24 of the UE 10. The UE 10 is configured to provide PS Data Service for the GPRS domain via a second IPR 26, a sub-network dependent convergence protocol (SNDCP) processor 28, the GSM/GPRS AS 30 and GSM/GPRS physical layer (PHY) components 32 of the UE 10, as shown on the left-hand side of FIG. 2. The URABM/UPDCP 12 includes a Radio Access Bearer Controller (RABC) and RAB(s). The RABC is the controller of the URABM and the RAB(s) are URABM services provided to the IPR 16. The URABM provides QoS enforcement and queuing and forwarding of data to the UPDCP segment in the uplink direction. The UPDCP formats data from the URABM and transfers formatted data to URLC 18 which is then transferred to the UMAC 22 and PHY components 24 for transmission to the physical media, such as a radio channel. The SM 14 is configured to indicate to the URAB/UPDCP 12 when a PDP context activation procedure is initiated. The SM 14 waits for an RB setup indication from the URRC 17. When the URABM/UPDCCP 12 receives a setup indication, it allocates resources and maintains a mapping in the data plane to transmit data.

The UPDCP segment of the URABM/UPDCP 12 contains a controller and RB(s). The RB(s) are the UPDCP services provided to URABM which includes header compression and transfer of PDP user data services of the URLC 18. The combined URAMB/UPDCP 12 implements control for the RBs and RABs as one process by recognizing that each RAB contains only one RB.

There are logically two controllers (RABC and PDCPC) in this combined process. Both of them receive external command signals, UPDCPC 12c receives command signals from the URRC 17 and RABC 12a/b receives command signals from SM 14 and GMM 15, but the two controllers operate jointly the same RABM/PDCP 12 state machine which determines the runtime modes of the data path that connects essentially the IP stack (via IPR 16) with the 3G UMTS specific radio bearers and channels (UPDCP 12 and URLC 18 and down). For example when the UE initiates a packet data call, the SM 14 informs via 12a the process with the RABMSM_ACTIVATE_IND signal, which brings the URABM/UPDCP 12 state from IDLE to WAIT_EST for awaiting the establishment of radio channels. Subsequently when the URRC 17 signals (via 12c) the process with the CPDCP_CONFIG_REQ command with the RAB and RB information, the state advances to RAB_EST and the internal switch for the two data paths (PDP Context with RAB and RB) is closed. Only at this state, uplink and downlink data traffic can flow and and data processing such as IP header compression can be performed.

GMM 15 is the protocol entity (in the NAS 11) for the handset mobility management in the packet switched network. The URABM/UPDCP 12 process interfaces it for the re-establishment of the supporting RAB/RB under the PS data path (PDP Context). Under certain circumstances, relatively low traffic volume in the packet mode may cause the network to relinquish the radio bearers/channels (RAB/RB) temporarily but keep the upper data path context (PDP Context/NSAPI) intact. When the handset has packet data to go out and the URABM/UPDCP 12 finds out (via the state machine) the supporting RAB/RB is missing, the GMM 15 is then signaled (via 12b) to request a RAB/RB from the network on behave of the PDP Context and NSAPI. The GMM 15 later will signal back to the URABM/UPDCP 12 for the result of the re-establishment.

While in the above case the GMM 15 helps for the upper data path, the URRC 17 is responsible for configuring the radio bearers/channels to all AS 34 layers from URABM/UPDCP and down, including all specific radio parameters to PHY 24. The URRC 17 receives configuration commands and parameters from its network peer. To URABM/UPDCP 12, the URRC 17 brings such details as the mapping between the PDP Context and the RAB/RB (in case of more than one PS path) and other details such as relocation information and/or IP header compression parameters.

Figure 3:
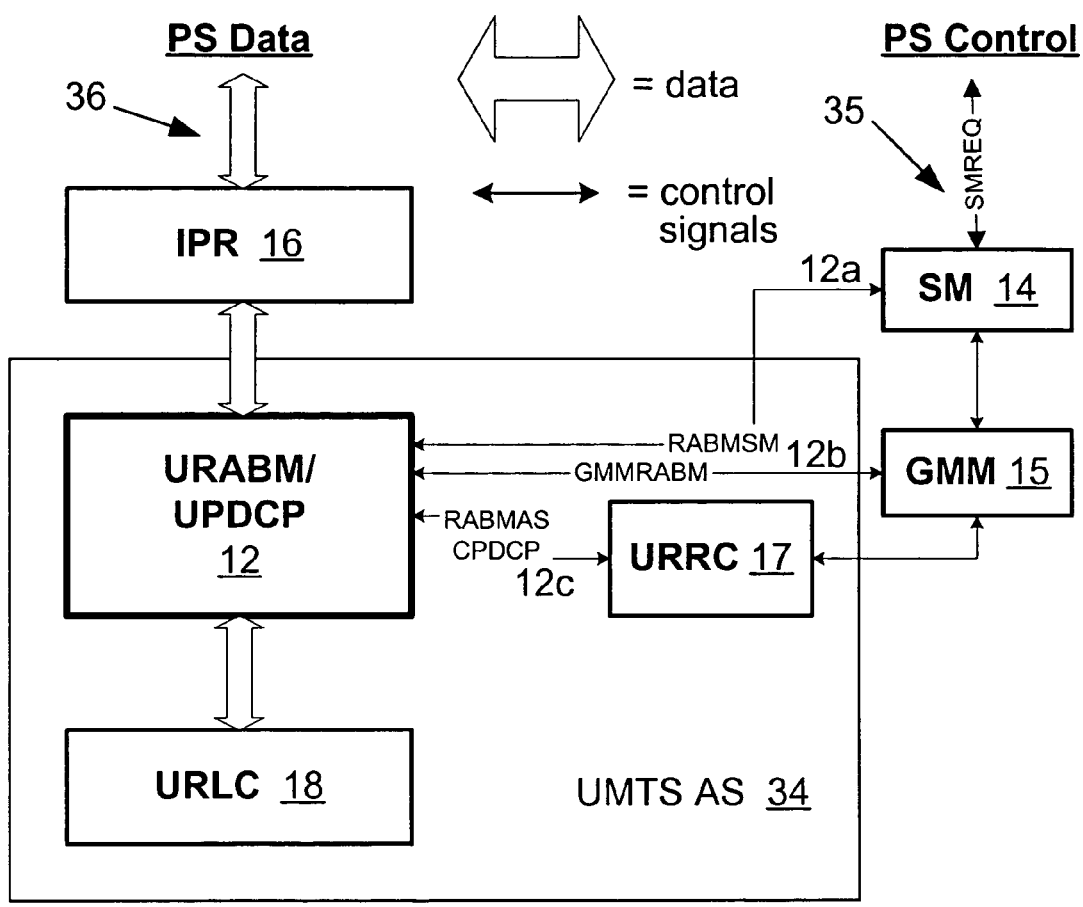
FIG. 3 is a schematic diagram of interfaces between URABM_UDPCP and other sub-layers.

FIG. 3 shows the combined the URABM/UPDCP 12 and its interfaces to other sub-layers is greater detail. The sub-layers are grouped into a PS-control-path 35 on the right side of FIG. 3 and PS-data-path 36 on the left side of FIG. 3.

The control interface to the RABC/UPDCP controller implemented in the combined URABM/UPDCP 12 includes controls that interface with the SM 14, a GPRS Mobility Management (GMM) component 15 and a UE Radio Resource Control (URRC) 17, also shown in FIG. 2. These include the RABM SM control interface 12a with the SM 14, a GMM RABM control interface 12b with the GMM 15 and a RABM AS and CPDCP control interface 12c with the URRC 17. The data interface for the combined URABM/UPDCP 12 extends between IPR 16 and URLC 18. More particularly, creation, modification and release of RABs are provided to the SM via control line 12.

The combined URABM/UPDCP module 12 may be configured as part of the UMTS Access Stratum (AS) domain 34 as shown in FIG. 3. The combined URABM/UPDCP module 12 is preferably implemented in one process that is static and initially created at start up.

The URABM/UPDCP is static, meaning that it is created at the UE power up stage as a running task among others in the operating system. This entity will then control the functions of RABC and PDCPC and maintain signal paths to SM, GMM and URRC. The process will not terminate at any point in the system's operation, maintaining operations even if the handset only runs on Circuit Switched mode.

Preferably, the URABM/UPDCP component 12 of FIGS. 2 and 3 is implemented on a single integrated circuit, such as an application specific integrated circuit (ASIC). However, the other components shown in FIGS. 2 and 3 may also be readily implemented on the ASIC with the combined URABM UPDCP component, although multiple separate integrated circuits can be used.

Other variations and modifications consistent with the invention will be recognized by those of ordinary skill in the art. Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A wireless transmit receive unit (WTRU) comprising:
   an Internet Protocol Relay (IPR) configured to transport Packet Switched (PS) data on radio access bearers (RABs),
   a Session Manager (SM) configured to manage RABs,
   a radio resource center (RRC) configured to control radio access bearer (RAB) and radio bear (RB) assignments for the WTRU,
   a radio link controller (RLC) configured to transport PS data on RBs, and a combined Radio Access Bearer Manager/Packet Data Convergence Protocol (RABM/PDCP) component configured to control communication PS data flow between the RLC and the IPR and to provide interface control with the SM and RRC such that processing of PS data and control of each RAB is associated with the processing of PS data and control of a single RB.

2. The invention of claim 1 wherein the WTRU is configured as a UE for use in a Universal Mobile Telecommunications System (UMTS).

3. A method for a wireless transmit receive unit (WTRU) that has an Internet Protocol Relay (IPR) that transports Packet Switched (PS) data on radio access bearers (RABs), a Session Manager (SM) that manages RABs, a radio resource center (RRC) that controls radio access bearer (RAB) and radio bear (RB) assignments for the WTRU and a radio link controller (RLC) that transports PS data on RBs, the method comprising:

controlling communication PS data flow between the RLC and the IPR; and providing interface control with the SM and RRC such that the processing of PS data and control of each RAB is associated with the processing of PS data and control of a single RB.

4. The method of claim 3 wherein the method is implemented in a UE used in a Universal Mobile Telecommunications System (UMTS).

5. A method for a wireless transmit receive unit (WTRU) that has an Internet Protocol Relay (IPR) that transports Packet Switched (PS) data on radio access bearers (RABs), a Session Manager (SM) that manages RABs, a radio resource center (RRC) that controls radio access bearer (RAB) and radio bear (RB) assignments for the WTRU and a radio link controller (RLC) that transports PS data on RBs, the method comprising:

controlling communication PS data flow between the RLC and the IPR providing Radio Access Bearer Manager (RABM) and Packet Data Convergence Protocol (DPCP) functions based on an association of one RB with each RAB; and providing interface control with the SM and RRC such that the processing of PS data and control of each RAB is associated with the processing of PS data and control of a single RB.

6. An application specific integrated circuit (ASIC) for a wireless transmit receive unit (WTRU) that has an Internet Protocol Relay (IPR) that transports Packet Switched (PS) data on radio access bearers (RABs), a Session Manager (SM) that manages RABs, a radio resource center (RRC) that controls radio access bearer (RAB) and radio bear (RB) assignments for the WTRU and a radio link controller (RLC) that transports PS data on RBs, the ASIC comprising:

means for controlling communication PS data flow between the RLC and the IPR; and means for providing interface control with the SM and RRC such that the processing of PS data and control of each RAB is associated with the processing of PS data and control of a single RB.

7. An apparatus for a wireless transmit receive unit (WTRU) that has an Internet Protocol Relay (IPR) that transports Packet Switched (PS) data on radio access bearers (RABs), a Session Manager (SM) that manages RABs, a radio resource center (RRC) that controls radio access bearer (RAB) and radio bear (RB) assignments for the WTRU and a radio link controller (RLC) that transports PS data on RBs, the apparatus comprising:

a combined Radio Access Bearer Manager/Packet Data Convergence Protocol (RABM/PDCP) component controlling communication PS data flow between the RLC and the IPR and providing interface control with the SM and RRC such that the processing of PS data and control of each RAB is associated with the processing of PS data and control of a single RB.

8. The invention of claim 7 wherein the WTRU is configured as a UE for use in a Universal Mobile Telecommunications System (UMTS) and the RABM/PDCP component is implemented in an application specific integrated circuit (ASIC).

* * * * *

UNITED STATES PATENT AND TRADEMARK OFFICE
CERTIFICATE OF CORRECTION

| | | |
|---|---|---|
| PATENT NO. | : 7,039,026 B2 | |
| APPLICATION NO. | : 10/975871 | |
| DATED | : May 2, 2006 | |
| INVENTOR(S) | : Francoeur et al. | |

It is certified that error appears in the above-identified patent and that said Letters Patent is hereby corrected as shown below:

ON THE TITLE PAGE

At section (73), Assignee:, before the word "Technology", delete "Interdigital" and insert therefor --InterDigital--.

IN THE SPECIFICATION

At column 2, line 31, after the word "serving", delete "networks", and insert therefor --network's--.

At column 3, delete line 32, and insert therefor --URABM/UPDCP--.

At column 3, line 34, before the words "and other", delete "URABM_UDPCP", and insert therefor --URABM/UPDCP--.

At column 5, line 2, after the word "data", delete "interfaces" and insert therefor --interface--.

At column 5, line 23, after the words "When the", delete "URABM/UPDCCP", and insert therefor --URABM/UPDCP--.

At column 5, line 67, before the words "of the", delete "behave" and insert therefor --behalf--.

At column 6, line 13, before "URABM/UPDCP", delete "the".

At column 6, line 14, before the word "greater", delete "is" and insert therefor --in--.

UNITED STATES PATENT AND TRADEMARK OFFICE
CERTIFICATE OF CORRECTION

PATENT NO. : 7,039,026 B2
APPLICATION NO. : 10/975871
DATED : May 2, 2006
INVENTOR(S) : Francoeur et al.

It is certified that error appears in the above-identified patent and that said Letters Patent is hereby corrected as shown below:

IN THE CLAIMS

At claim 5, column 7, line 39, before the word "functions", delete "(DPCP)" and insert therefor --(PDCP)--.

Signed and Sealed this

Twentieth Day of May, 2008

JON W. DUDAS
*Director of the United States Patent and Trademark Office*